Nov. 22, 1966  F. R. McFARLAND  3,287,513
ROLLER DETENT MECHANISM FOR CONTROL APPARATUS
Filed Oct. 17, 1963  2 Sheets-Sheet 1
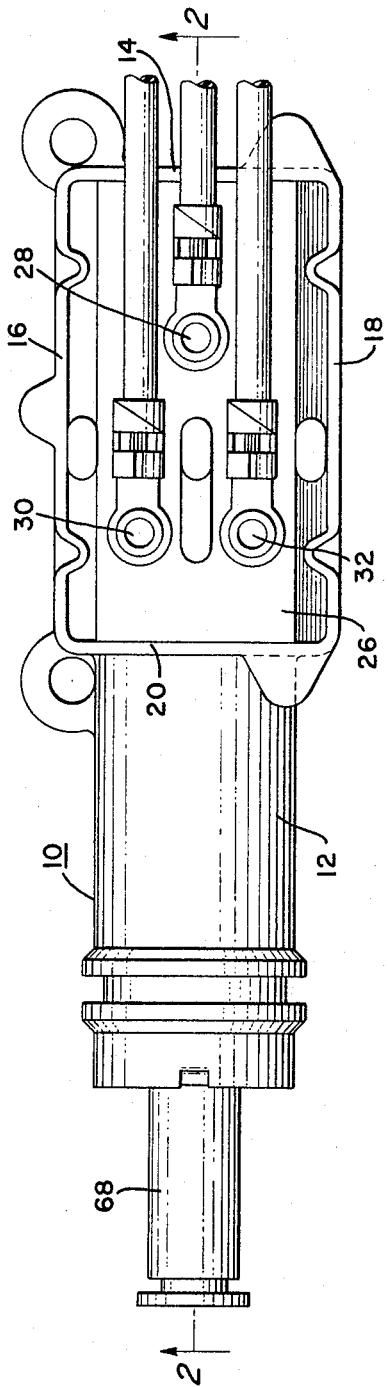
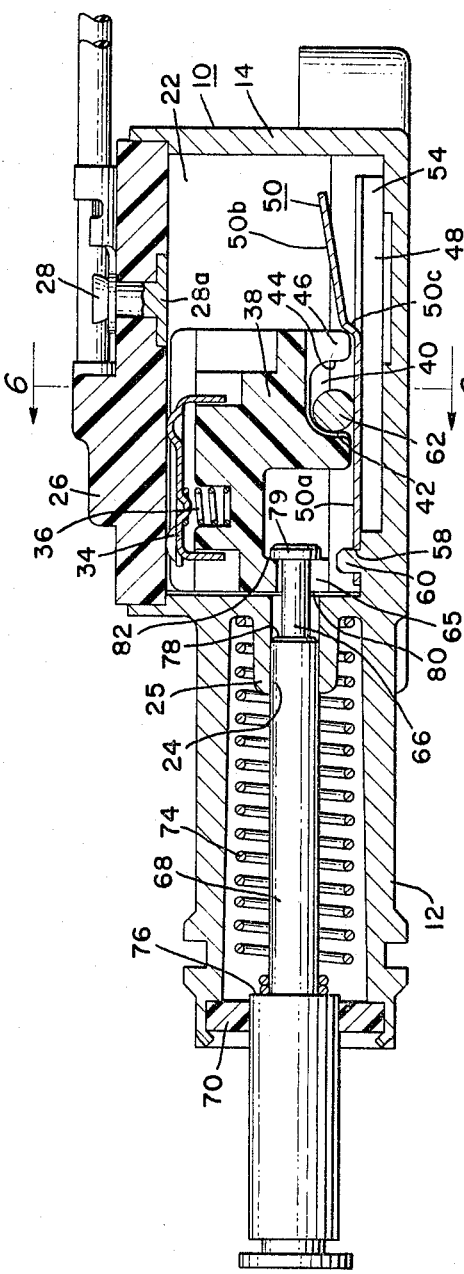
INVENTOR.
Forest R. McFarland
BY C. R. Meland
His Attorney

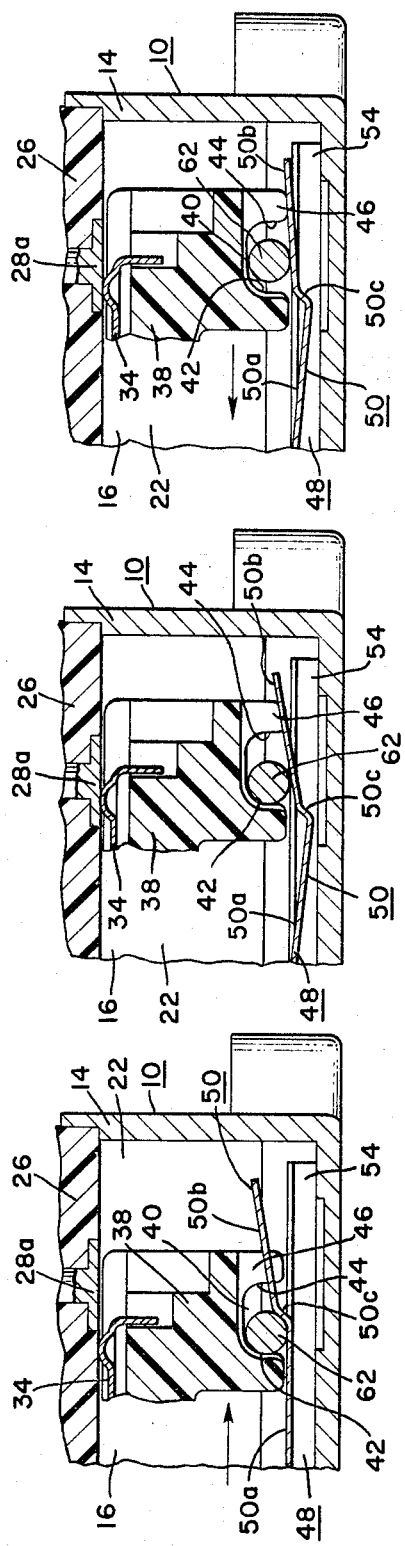

United States Patent Office 3,287,513
Patented Nov. 22, 1966

3,287,513
ROLLER DETENT MECHANISM FOR CONTROL APPARATUS
Forest R. McFarland, Flint, Mich., assignor to General Motors Corporation, Detroit, Mich., a corporation of Delaware
Filed Oct. 17, 1963, Ser. No. 316,966
7 Claims. (Cl. 200—16)

This invention relates to a friction-free detent mechanism for control apparatus such as a detent mechanism for an electric switch wherein it is desired to provide a reactive detent feel when actuating the electric switch or other control apparatus to a predetermined position.

The present invention is concerned with providing a control apparatus that has a detent feel mechanism for providing a feel or reaction to the operator of the control apparatus that he has actuated the apparatus to a certain position. One use of such an apparatus is in the control of a motor vehicle automatic transmission where it is desired to downshift the transmission when the driver of a motor vehicle depresses the accelerator pedal to a certain point. The mechanism of this invention will provide a detent feel or reactive force at the point where further shifting of the control apparatus will cause a downshifting of the transmission. In the apparatus to be disclosed, the control device is an electric switch which is capable of controlling a solenoid in a hydraulic transmission to cause the downshifting.

Detent mechanism of the spring biased ball type and other similar detent mechanisms are well-known in the switch art. In contrast to these well-known types of detent mechanisms, it is an object of this invention to provide a detent mechanism of a type wherein a roller is interposed between a shiftable element and a detent spring. The shiftable element may be the contact carrier of an electric switch and this shiftable element has a slot which accommodates the roller. In carrying this object foward, the slot of the shiftable element is made wider than the diameter of the roller and the detent spring is provided with an abutment means which engages the roller when the shiftable element is shifted in one direction. Further movement of the roller causes it to pass the abutment means and it then slides on a flat portion of the detent spring. When an actuator is released a spring returns the shiftable element to its normal position and by providing a slot in the shiftable element that is wider than the diameter of the roller, it has been found that the roller will actually roll on the detent spring as the actuator of the control apparatus is being shifted back to its neutral position by the spring.

It has been found that by providing a slot in the shiftable element that is wider than the roller, a relatively light spring can be used to return the shiftable element to its neutral position. This has the advantage of reducing the force that the operator must work against when the shiftable element is being moved toward the downshift position and also has the advantage of providing a smooth operating mechanism, as compared to an arrangement where the roller cannot roll.

It is another object of this invention to provide a detent mechanism for a switch or the like which has smooth operating characteristics and which requires a relatively light spring to return the shiftable element of the apparatus to its neutral position.

Another object of this invention is to reduce the frictional drag between the shiftable element and the detent spring when the shiftable element is being returned to its neutral position by a resilient means.

Further objects and advantages of the present invention will be apparent from the following description, reference being had to the accompanying drawings wherein preferred embodiments of the present invention are clearly shown.

In the drawings:
FIGURE 1 is a top view of a control apparatus that has the detent feel mechanism of this invention.
FIGURE 2 is a sectional view taken along line 2—2 of FIGURE 1.
FIGURES 3, 4 and 5 illustrate a portion of FIGURE 2 and illustrate various working positions of the shiftable element and roller.
FIGURE 6 is a sectional view taken along line 6—6 of FIGURE 2.
FIGURE 7 is a perspective view of the detent spring that is used in the control shown in FIGURE 2.

The detent feel mechanism of this invention is to be described in connection with an electric switch, but it is to be understood that this mechanism could be used wherever it is desired to provide a detent feel or reaction force when a shiftable element is moved in one direction and wherein it is desired to provide a relatively light spring to return the shiftable element to its neutral position.

Referring now to the drawings and more particularly to FIGURES 1 and 2, the reference numeral 10 generally designates a metal housing which has a tubular section 12. The housing 10 has walls 14, 16, 18 and 20 which define a switching compartment 22. The interior of the tubular section 12 communicates with the compartment 22 through an opening 24 formed in boss 25.

The open end of the compartment 22 is closed by an insulator 26 which carries the rivet contacts 28, 30 and 32. The rivet contacts 28, 30 and 32 are connected by means of terminals with wires as shown and the rivet contact 28 has a section 28a which forms one of the fixed contacts for the switch. The rivet contacts 30 and 32 have similar contact sections which are not illustrated and which are longer than the section 28a.

The fixed contacts of the switch which are the lower ends of rivets 28, 30 and 32 cooperate with a shiftable contactor 34 which is spring biased into engagement against one face of the insulator 26 by a spring 36 located in a recess formed in a contact carrier 38. The contact carrier 38 is formed of insulating material and the contactor 34 is made in a general triangular shape and has bosses which can engage the contact portions of rivets 28, 30 and 32. The arrangement is such that with the contact carrier 38 in the position shown in FIGURE 2, the rivets 30 and 32 are connected by contact 34. In another position the rivets 30, 32 and 28 are connected.

The contact carrier 38 has a slot 40. This slot is defined by a wall 42 and a pair of walls 44 only one of which is illustrated in the drawings. The pair of walls 44 are defined by two integral sections 46.

The lower end of the compartment 22 contains a detent spring which is generally designated by reference numeral 48 and which is shown best in FIGURES 3, 4 and 7. This detent spring 48 has a spring finger section 50 which is spaced from sections 52 and 54 which are joined to an end section 56. The spring finger section 50 has two flat sections 50a and 50b separated by a section 50c which extends upwardly from the section 50a and which provides an abutment as is more fully described hereinafter.

The sections 52 and 54 of the detent spring 48 engage the lower wall of compartment 22 and this detent spring has an opening 58 which receives a boss 60 formed integral with the housing 10. The detent spring 48 is formed of a resilient material such as spring steel.

A cylindrical roller 62 is interposed between the spring finger 50 of the detent spring and the contact carrier 38.

This roller is located between walls 42 and 44 and the ends of the roller 62 are positioned adjacent a pair of walls 64 as shown in FIGURE 6. The walls 64 are an integral part of the contact carrier 38 and prevent the roller 62 from sliding axially when the switch is in operation.

It is important to note that the distance between walls 42 and 44 is greater than the diameter of the roller 62 and this provides a smooth operating switch and actually permits the roller 62 to roll under certain conditions which are described hereinafter. The distance between walls 42 and 44 is nearly twice the diameter of the roller 62.

The contact carrier 38 has a slot 65 which receives a reduced section 66 of an actuating rod 68. The actuating rod 68 is slidably supported by a guide 70 and by the boss section 25 of the housing 10. A spring 74 is interposed between one portion of the housing 10 and the wall section 76 of the plunger 68. It is noted that the shoulder 78 of the plunger will engage wall section 80 of the contact carrier 38 when the plunger 68 is moved rightwardly in FIGURE 2. When the spring 74 returns the plunger to its position shown in FIGURE 2, one side of the section 79 of the plunger engages the section 82 of the contact carrier to pull the contact carrier 38 to its FIGURE 2 position.

The control device that has just been described can be used to control the downshifting of an automatic hydraulic transmission. When used in this manner the plunger 68 is connected with the accelerator pedal on a motor vehicle while the rivet 30 is electrically connected with a battery on the motor vehicle. The rivets 28 and 32 are used to apply electrical signals to a transmission to control the downshifting of the transmission. It will, of course, be appreciated that the control apparatus of this invention could have other uses and it could be used wherever it is desired to have a detent feel mechanism for a control apparatus.

The operation of the detent feel force reaction mechanism of this invention will now be described. When the plunger 68 is depressed as by the accelerator pedal on a motor vehicle, the shoulder 78 of the plunger will move toward the wall 80 of the contact carrier 38. The contact carrier 38 will not move until one end of the shoulder 78 engages the wall 80 of the contact carrier. When the plunger engages the contact carrier, the contact carrier 38 will move rightwardly in FIGURE 2 and the wall 42 of the contact carrier will cause the roller 62 to slide along the top surface 50a of the spring finger 50. The operator at this time feels little or no resistance to movement of the plunger 68 since the only force that has to be overcome is the force of the spring 74 and the friction between roller 62 and section 50a of the detent spring and the friction of the contact 34 sliding on the inner surface of insulator 26.

As the contact carrier 38 is moved rightwardly, the time will come when the roller will engage the abutment section 50c of the spring 50 as shown in FIGURE 3. The operator of the control device will now feel a positive force provided by the section 50c and this force must now be overcome in order to move the contact carrier 38 any further in a rightward direction. In the case of an automatic transmission downshifting mechanism, the engagement of roller 62 with section 50c can coincide with a point where further movement of the plunger 68 to overcome the positive force will cause a downshifting of the transmission.

When the contact carrier 38 is now moved to overcome the positive detent force provided by section 50c of spring finger 50, the spring finger is bent downwardly and the roller now slides on section 50b of the spring finger toward the FIGURE 4 position. The force now required to shift the contact carrier 38 is now greatly reduced since the abutment section 50c has now been passed and the contact carrier is now in a position to connect rivets 28, 30 and 32 to provide a downshifting for the transmission.

When the operator releases the plunger 68 after having moved it to the FIGURE 4 position, the spring 74 urges the plunger 68 towards the position shown in FIGURE 2. The contact carrier 38 will not move leftwardly until the shoulder 78 leaves the wall 80 and the section 79 engages the wall 82. When the section 79 of the plunger engages the wall 82, the roller is in engagement with wall 42 as shown in FIGURE 4. As the contact carrier 38 now starts to move leftwardly, the roller 62 will rotate or roll along the top side of section 50b from the FIGURE 4 to the FIGURE 5 position which provides little or no friction to the leftward movement of the contact carrier 38. This makes it possible to use a light spring 74 to return the contact carrier 38 to its FIGURE 2 position since the roller 62 rolls on the top of section 50b during the return movement of the contact carrier 38.

The roller on its return movement will roll until it is engaged by wall 44. The final returned position of the contact carrier 38 and the roller 62 is illustrated in FIGURE 2.

The roller 62 can also roll to some extent on the section 50a of the spring finger 50 depending upon the position of the roller 62 when the contact carrier 38 is returned to its FIGURE 2 position. Thus, it is possible when the contact carrier 38 is returned to its FIGURE 2 position for the roller to be between the walls 42 and 44 rather than in engagement with the wall 42. The wall 42 is always engaged by the roller 62 when the roller engages the abutment section 50c of the spring finger 50. It will be appreciated that the amount of roll of the roller 62 depends on the spacing of walls 42 and 44 relative to the diameter of the roller 62.

While the embodiments of the present invention as herein disclosed, constitutes preferred forms, it is to be understood that other forms might be adopted.

What is claimed is as follows:

1. A detent mechanism for control apparatus comprising, a support, a shiftable element slidable with respect to said support, a spring finger supported in cantilever fashion by said support having an abutment section located intermediate its ends, said shiftable element having a recess defined by spaced wall means, a laterally extending roller located in said recess engaging one face of said spring finger, said roller engaging a wall of said recess whereby it is held against said spring finger by said shiftable element, said spring finger extending across the path of movement of said roller, one of said wall means forcing said roller into engagement with and past said abutment section of said spring finger when said shiftable element is moved in one direction and the other of said wall means shifting said roller in an opposite direction over said face of said spring finger when said shiftable element is moved in an opposite direction, said spring finger applying a reactive force to said shiftable element through said roller when it engages said abutment section, said spring finger being bent away from said control element to reduce said reactive force when said roller is shifted past said abutment section, said wall means being spaced from each other a distance greater than the diameter of said roller whereby said roller can roll between said shiftable element and said face of said spring finger.

2. In combination, a housing, a spring assembly supported by said housing including a pair of side rail sections and a spring finger located between said side rail sections, said spring finger having an abutment section located intermediate its ends, said spring finger being supported at one end from said side rail sections and in its free position extending in one direction from said side rail sections, said shiftable element being movable relative to said housing and having a recess defined by spaced walls, and a roller located in said recess and engaging said shiftable element, one face of said spring finger and said side rail sections, said roller being adapted to engage said abutment section of said spring finger when said shiftable element is moved in one direction, said spring finger providing a reactive force to further movement of said shiftable element and roller when it engages said abutment section, said spring finger being bent in a direction toward said side rail sections when said shiftable element and roller are moved beyond said abutment section to reduce the reactive force applied to said shiftable element, said walls of said recess being spaced from each other a distance which is greater than the diameter of said roller.

3. A control apparatus comprising, a housing, a spring assembly supported by said housing including two longitudinally extending sections and a body section joining said longitudinally extending sections, a spring finger supported at one end in cantilever fashion by said body section of said spring assembly located between said longitudinally extending sections, said spring finger having an abutment section located intermediate its ends, a contact carrier carrying an electrical contact slidably supported for movement relative to said housing, said contact carrier having a recess defined by first and second walls, a laterally extending roller positioned in said recess engaging one face of said spring finger and said longitudinally extending sections of said spring assembly, said roller engaging said abutment section in one position of said contact carrier to apply a reactive force to further movement of said contact carrier, said spring finger bending toward said longitudinally extending sections of said spring assembly when said contact carrier is moved beyond said abutment section, said first and second walls being spaced from each other a greater distance than the diameter of said roller whereby said roller can roll on said spring finger when it is shifted, and a fixed electrical contact supported by said housing, said fixed electrical contact being engaged by the contact carried by said contact carrier in one position of said shiftable element.

4. A control apparatus comprising, a housing, a spring assembly supported by said housing including a support section and a spring finger extending from said support section, said spring finger being connected at one end thereof to said support section and being adapted to be bent toward said support section, a control element shiftable along a predetermined path parallel to the longitudinal axis of said spring finger, said control element including first and second spaced walls, and a roller engaging said control element and one face of said spring finger, said roller being positioned between said control element and said spring finger and between said first and second walls, said roller moving on said face of said spring finger when said control element is shifted axially along the longitudinal axis of said spring finger, said spring finger having an abutment section located intermediate its ends which is engageable with said roller in one position of said control element to apply a reactive force to said control element to further movement of said control element in one direction, said spring finger bending toward said support section when said control element is moved to a point where said roller passes said abutment section of said spring finger whereby the reactive force applied to said control element is reduced, said first and second walls being spaced a greater distance than the diameter of said roller.

5. The control apparatus according to claim 4 where the support section of the spring assembly is defined by a pair of axially extending parts located on opposite sides of the spring finger and engaging the roller.

6. A control apparatus comprising, a housing, a control element supported by said housing for movement along a predetermined path, a spring finger supported at one end thereof by said housing extending across said predetermined path of movement of said control element, said spring finger having an abutment section and extending in the same direction as the path of movement of said control element, said control element having a recess defined by first and second end walls, and a roller disposed within said recess and engaging one flat surface of said spring finger, said roller being disposed between and in engagement with said control element and said spring finger, said roller moving along said flat surface of said spring finger when said control element is shifted, said roller engaging said abutment section of said spring finger in one position of said control element whereby said spring finger applies a reactive force to further movement of said control element, said control element being shifted beyond the point where said roller engages said abutment section of said spring finger and operative to bend said spring finger away from said control element when said control element is shifted to a position where said roller overrides said abutment section of said spring finger, the reactive force applied to said control element through said roller from said spring finger being reduced when said spring finger is bent away from said control element, the distance between said first and second end walls of said recess being greater than the diameter of said roller.

7. The control apparatus according to claim 6 where the recess that receives said roller has side walls for confining said roller from axial movement.

References Cited by the Examiner

UNITED STATES PATENTS

| | | |
|---|---|---|
| 1,156,681 | 10/1915 | French. |
| 1,694,928 | 12/1928 | Rider. |
| 1,740,535 | 12/1929 | Bramming _____ 200—166 X |
| 2,447,318 | 8/1948 | Dazley et al. _____ 200—16 |
| 2,586,892 | 2/1952 | Weber et al. _____ 200—168 X |
| 2,763,739 | 9/1956 | Forstrom et al. ____ 200—166 X |
| 3,060,285 | 10/1962 | Steinbruner _____ 200—16 |

FRED C. MATTERN, Jr., *Primary Examiner.*

BROUGHTON G. DURHAM, *Examiner.*

C. F. GREEN, *Assistant Examiner.*